Jan. 14, 1936.  A. Y. DODGE ET AL  2,027,580
TESTING APPARATUS
Filed June 19, 1929  3 Sheets-Sheet 1

INVENTORS
ADIEL Y. DODGE
ROBERT J. STATZ
BY H. O. Clayton
ATTORNEY

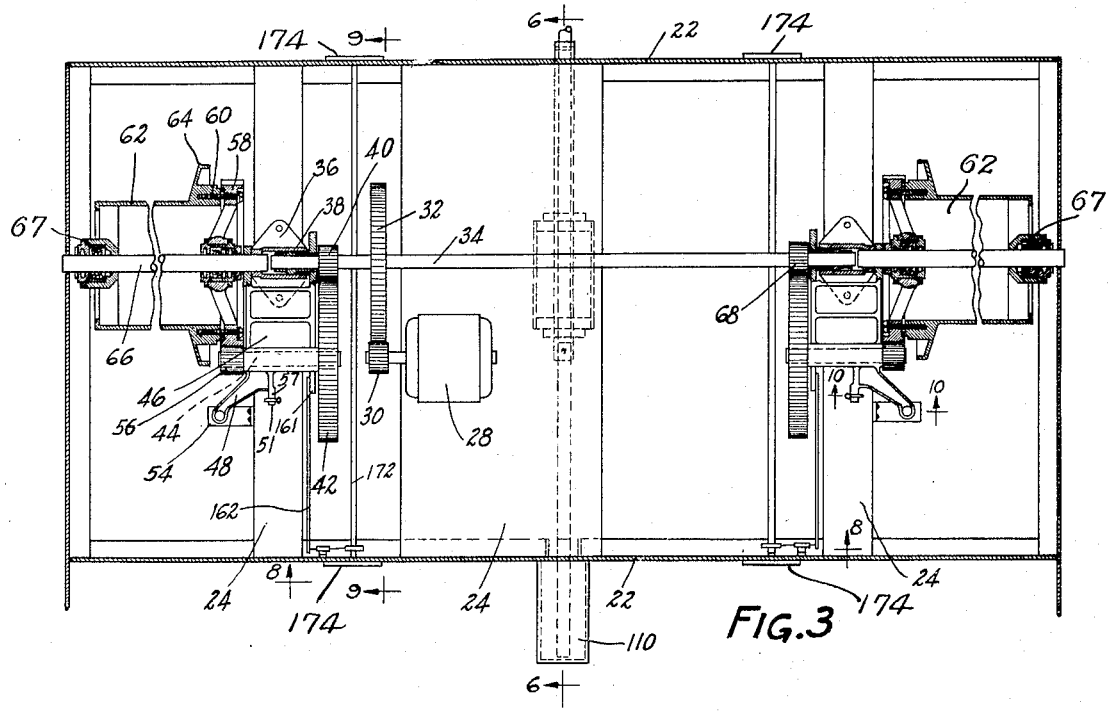
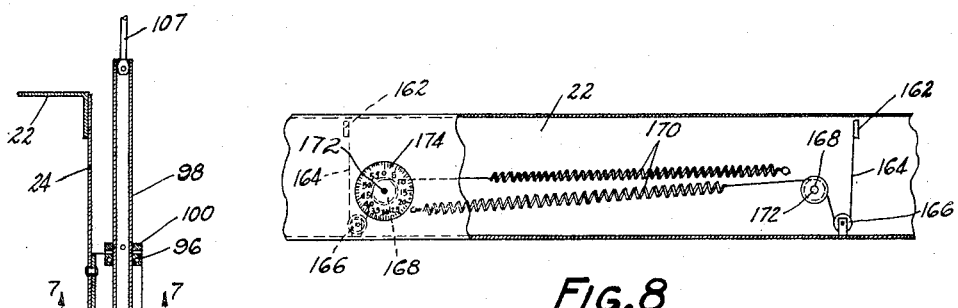
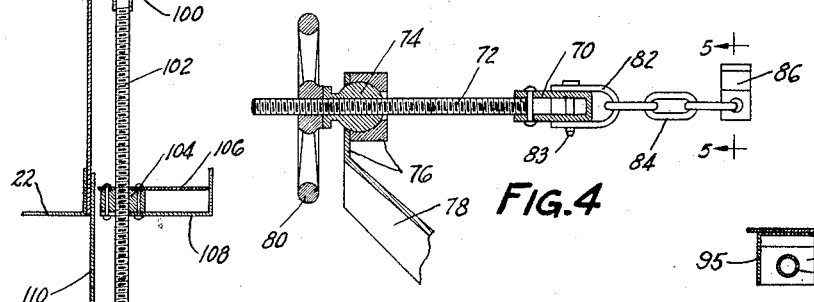
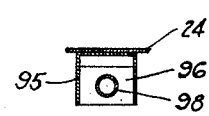

Jan. 14, 1936.  A. Y. DODGE ET AL  2,027,580
TESTING APPARATUS
Filed June 19, 1929  3 Sheets-Sheet 3
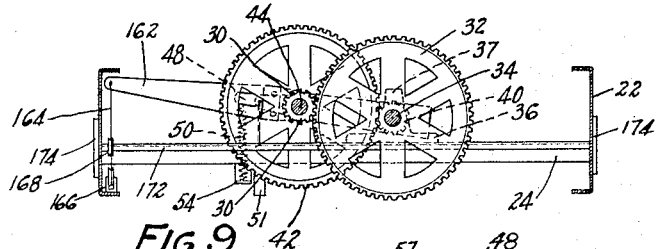
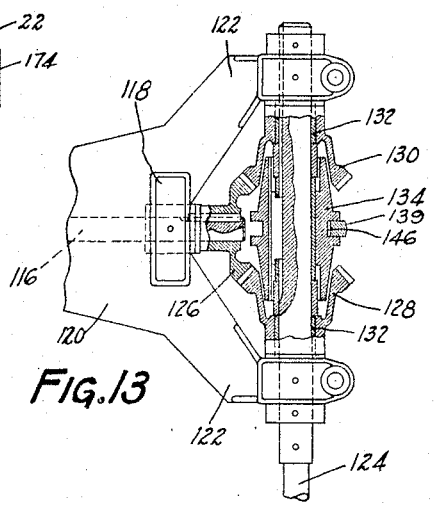
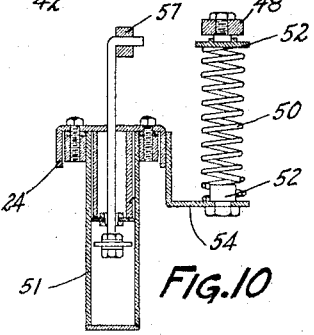
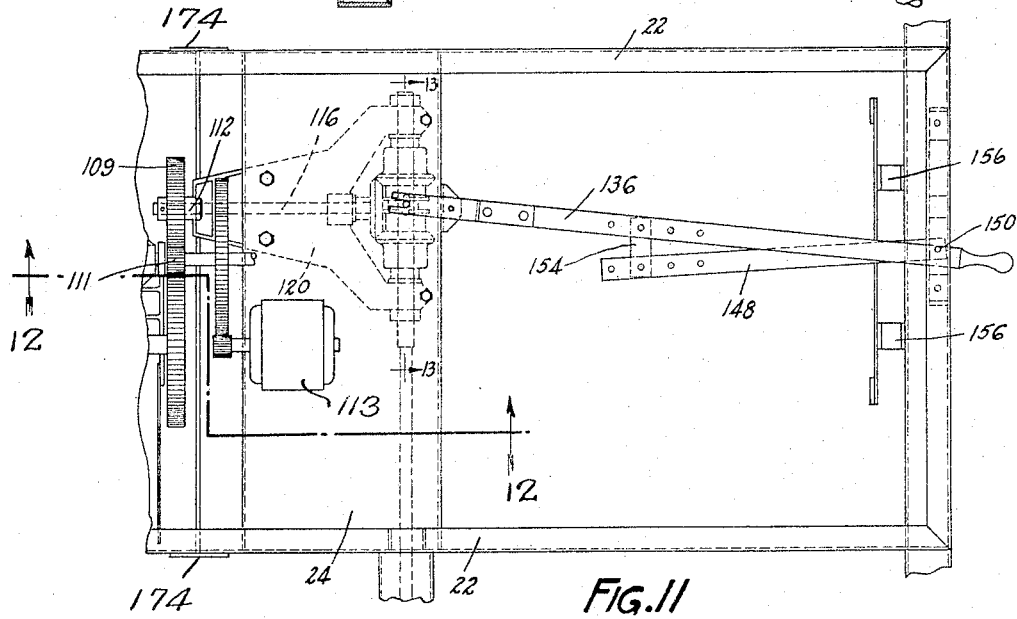
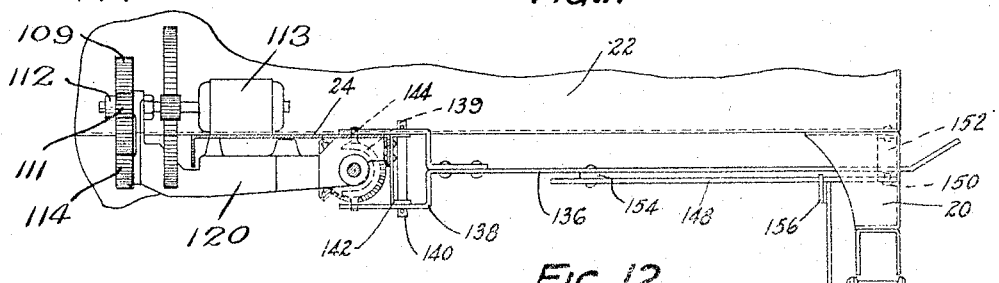
INVENTORS
ADIEL Y. DODGE
ROBERT J. STATZ
BY H. O. Clayton
ATTORNEY Patented Jan. 14, 1936

2,027,580

UNITED STATES PATENT OFFICE 2,027,580

TESTING APPARATUS

Adiel Y. Dodge and Robert J. Statz, South Bend, Ind., assignors, by mesne assignments, to Bendix-Cowdrey Brake Tester, Inc., New York, N. Y., a corporation of Delaware Application June 19, 1929, Serial No. 372,062

9 Claims. (Cl. 265—25)

This invention relates to testing of automobiles or the like and is illustrated as embodied in mechanism for testing a set of four-wheel automobile brakes.

A principal object of the invention is to provide apparatus for measuring brake resistance at a factory, garage or service station so as to avoid the necessity of the road tests now commonly employed for this purpose.

A further object of the invention contemplates the provision of a testing apparatus comprising rotatable wheel support members, each actuated by a train of gears, certain of the gears combining a driving and indicating function whereby each rotatable wheel support may be rotated, against the resistance of a brake associated with a wheel on the support. The indicating gears are angularly or bodily movable about an axis coinciding with the axis of the support member, the degree of said angular movement indicating the degree of brake resistance.

In one desirable and simplified arrangement, each wheel of a motor vehicle is turning against the resistance of its brake by a combined driving and indicating means comprising a driving pinion keyed to a shaft mounted in a bearing bodily rotatable about the axis of a rotatable wheel supporting and driving element driven by the driving pinion.

With no brake resistance to the rotation of the driven wheel supporting and driving element, the driving pinion is not bodily displaced, but with the application of the brake, the resistance thereof to the rotation of the wheel supporting element effects a translatory movement of the driving pinion together with its bearing, the degree of which movement is indicated by a suitable indicator.

Other features of the invention relate to a power operated means for adjusting the testing apparatus for length to thus be accommodated to automobiles of different wheel base; to a lever means for automatically rendering said power means inoperative; to an anchor structure for securing the automobile chassis to the testing apparatus while under test; to means for preventing undue swiveling of the front wheels when under test; to a manually adjustable mechanism for effecting change of wheel base and to various other novel details of construction and desirable combinations of parts which will be apparent from the following description of the illustrative embodiments shown in the accompanying drawings, in which:

Figure 3 is a section taken on line 3—3 of Figure 2 illustrating partly in section and partly in plan various parts of the testing apparatus;

Figure 4 is a sectional view taken on line 4—4 of Figure 1 illustrating details of the anchor structure;

Figure 5 is a section taken on the line 5—5 of Figure 4 illustrating the hook for attachment to the spring horn of the automobile;

Figure 6 is a longitudinal sectional view taken on line 6—6 of Figure 3 showing details of the manually adjustable mechanism for change of wheel base;

Figure 7 is a section taken on line 7—7 of Figure 6 indicating a detail of the manually adjustable mechanism;

Figure 8 is a section taken on line 8—8 of Figure 3 showing parts of the indicating mechanism;

Figure 1:
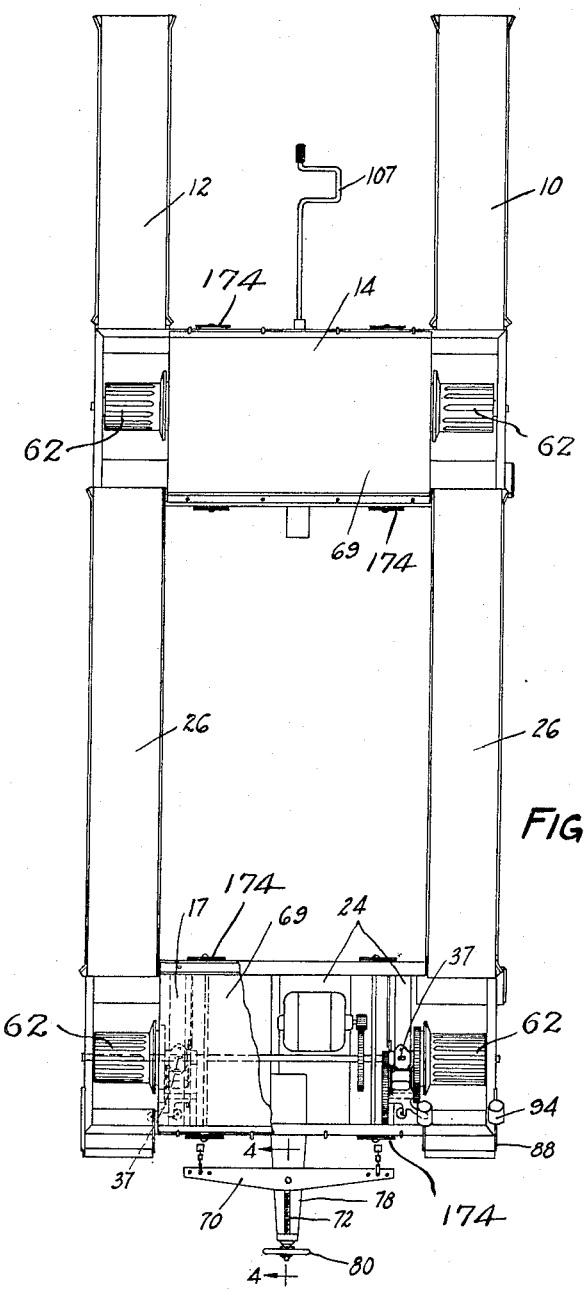
Figure 1 is a top plan of the apparatus.
Figure 14:
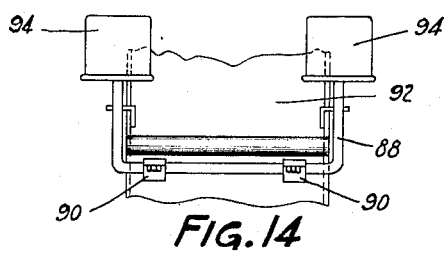

Figure 9 discloses a section taken on line 9—9 of Figure 3 showing in side elevation parts of the indicating and driving means;

Figure 10 is a section on line 10—10 of Figure 3 showing a means for absorbing a portion of the resisting force of the brake;

Figure 11 is a view showing a portion of the movable carriage of Figure 1, together with power means for adjusting the length of the apparatus for change of wheel base;

Figure 12 is a fragmentary elevation shown in the mechanism of Figure 11;

Figure 13 is a section taken on line 13—13 of Figure 11 indicating details of the power wheel base changing mechanism; and Figure 14 is a detail view of the wheel aligning mechanism.

The illustrated apparatus comprises inclined ramps 10 and 12 detachably connected by suitable hooks to a movable carriage 14 having wheels or rollers 16 adapted to travel on tracks 18 on opposite sides of the apparatus. Carriage 14 is preferably fabricated to include uprights 20 supporting channel-sectioned side and end frame members 22, and cross frame members 24. Channel-shaped runways or tracks 26 are positioned, one on each side of the apparatus, the same being disconnectedly supported at their ends upon the rear carriage 14 and a front stationary support 17 similar in all essential details to the movable carriage 14.

The principal elements of the testing apparatus are disclosed in detail in Figure 3 and preferably comprise a motor or equivalent power source 28 supported on one of the cross frame members 24 of the movable carriage 14. The armature shaft of the motor may be provided with pinion 30 driving spur gear 32 keyed to drive shaft 34. Shaft 34 may be journaled in bearing 36 secured to a cross frame member, a bushing 38 being interposed between the bearing and shaft. A pinion 40 keyed to the drive shaft 34 is arranged to drive the spur gear 42, the latter being keyed to the drive shaft 44 journaled in one end of a one-piece reinforced lever member 46 which is pivoted to shaft 34.

Lever 46 may be provided with an arm 48 arranged to engage compression spring 50 (Figure 10) supported by suitable fittings 52 secured to a bracket 54 secured to one of the cross frame members. Upon the other end of the shaft 44 there is keyed a pinion 56 in mesh with a spur gear 58 rigidly secured as by bolts 60 to a cylindrically-shaped wheel supporting and driving drum roller 62. Roller 62 is preferably provided with spaced grooves on its outer surface to provide a roughened traction face and may also be enlarged at one end to house bolts 60 and provide an inclined flange 64 to prevent the wheel from sliding inwardly off the roller. Both the roller 62 and the gear 58 are rotatably supported on a jack-shaft 66 co-axially aligned with drive shaft 34, the jack shaft being journaled at its outer end in a bearing 67 supported by a side frame member and at its inner end in bearing 36. Bearing 36 may be provided with an oil inlet 37, as disclosed in Figure 1.

The left rear testing unit shown to the right in Figure 3 is a duplicate of the right rear unit just described, the drive shaft 34 extending across the apparatus to drive pinion 68 similar to pinion 40. The front brake testing units mounted on the stationary carriage are similar to the units described for the movable rear carriage. Both carriages may be provided with covers 69 hinged to the top of the frame, to protect the mechanism from the ingress of dirt and other foreign matter.

In operation, a car to be tested is driven up the inclined ways 10 and 12, thence over the ways 26 and the front wheels positioned on the front set of rollers in the stationary carriage. The chassis is then secured in position. This is accomplished by a "single tree" type of lever 70 U-shaped in cross section (Figure 4) which is pivoted at its center to the I-shaped end of a threaded rod 72. This rod may be threaded through a ball member 74 fitting within a two-part socket member 76, one of said parts secured to one end of a channel-shaped inclined tongue member 78 extending outwardly from one of the side cross members of the stationary carriage, and that portion of the threaded rod extending beyond the ball and socket joint may be provided with hand wheel 80 threaded on the rod to lock the adjustment of the lever 70.

As shown in Figures 4 and 5, the lever is provided at its ends with U-shaped members 82 pivoted to the lever by pin 83 and to these members are secured chain 84, having hooks 86 adapted to embrace the spring horns of the car. This construction securely anchors the car against the rearward dragging action. The ball and socket connection described gives the necessary universal action to the lever.

In order to obviate an undue amount of swiveling of the front wheels while the brakes are being tested, we provide a construction comprising a U-shaped rod or yoke 88 (Figure 14) swiveled in bearings 90 on the outer face of a channel-shaped inclined extension 92 on the front frame structure. Cylindrical weights 94 are preferably threadedly mounted on the ends of the rods 88, which weights serve as stops determining a channel within which the wheels may rotate. When not in use the rod may be rotated to position the weights beneath the extension.

With the car anchored and the guide weights in position, the movable rear carriage 14 is then adjusted for the wheel base of the car. The means for making this adjustment is shown in detail in Figure 6. The central cross frame member 24 may be provided on its under side with a channel section fitting 95 riveted thereto, which fitting is provided with end cross members 96 (Figure 7), through which passes a tubular adjusting rod 98. This rod may be provided with collars 100 keyed thereto, and arranged to abut the outside faces of cross pieces 96. A threaded rod 102 may be telescoped at its ends within one end of the rod 98 and keyed thereto to rotate therewith. Rod 102 is preferably threaded within a nut 104 secured by a plate 106 to a base support member 108. A guard plate 110 secured to the side of the frame, extends over the end of the rod 102. It will be seen that with rotation, in either direction, of the rod 98, as by a wrench 107, the rod 98 will carry with it through the intermediary of the collars 100 abutting the fitting 95 the movable carriage. The rod is thus rotated until the rollers are positioned beneath the rear wheels of the car. The rod 98 and its associated structure constitute a lock to hold the carriage in place.

As an alternative to the manually operated adjusting mechanism just described, we may provide a power operated mechanism illustrated in Figures 11, 12, and 13. An idler gear 109 may be meshed with the pinion 111 corresponding to pinion 40 of Figure 3, and driven through suitable gearing from a motor 113, the testing unit here disclosed being identical with that previously described. Idler 109 is preferably journaled in a bearing support 112 secured to the cross member 24 and is in mesh with the driving pinion 114 beneath the idler, which pinion is keyed to a drive shaft 116. Shaft 116 is preferably supported at its other end in a bearing 118 forming part of a channel section support frame 120 bolted or otherwise secured to the under side of a cross member 24. Frame 120 diverges at one of its ends to provide yoke arms 122 forming bearing supports for a shaft 124 provided with the threaded nut mechanism of Figure 6 to remove the carriage.

As indicated in Figure 13, shaft 116 is provided at its end with beveled pinion 126 meshing with bevel gears 128 and 130 sleeved over bushings 132 on shaft 124. A double frusto-conical clutch member 134 may be slidably keyed to the bushed shaft 124 and is moved in either direction along the same into frictional engagement with the correspondingly tapered inner surface of the gears 128 and 130 by a lever member 136.

The operating lever 136 may comprise a yoked end 138 fulcrumed on a pin 140 supported in bracket 142 secured to cross member 24. The ends of the yoke are preferably provided with openings to receive trunnion pins 144 upon yoke member 138 slidably mounted in channel 146 at the center of cone clutch member 134. Lever 136 preferably extends through the side of the apparatus, as indicated in Figure 11, and may be provided with automatic stop mechanism comprising a lever 148 pivotally fulcrumed at its end 150 to a bracket 152 secured to the frame and linked at 154 to an intermediate portion of the lever 136.

To operate the power operated mechanism just described, it is merely necessary to throw lever 136 one way or the other to slide clutch 134 into engagement with either of the rotating beveled gears 128 or 130. The shaft 124 is thus driven in the desired direction to position the rear set of rollers under the rear wheels. With the correct position attained, the clutch is then disengaged by movement of lever 136. The stop lever is provided to obviate running the clutch too far upon failure to manually throw the lever 136, which stop lever contacts a stop 156 secured to the track, automatically tripping the lever 136 to disengage the clutch. With the wheels correctly positioned upon the four rollers and the chassis firmly locked in place by lever 70, the car is then ready for brake test.

Figure 2:
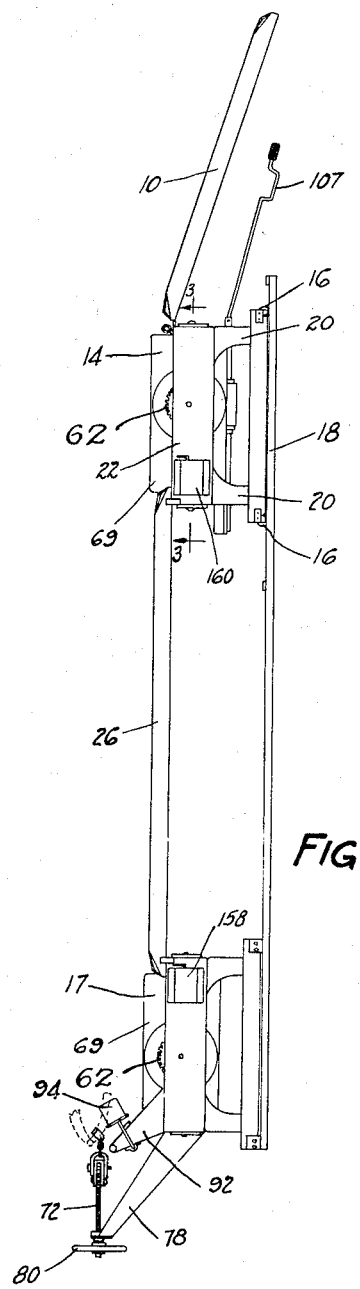
Figure 2 is a side elevation of the apparatus.

The switches 158 and 160 (Figure 2) controlling the motors are thrown, whereupon the driving gear train functions to rotate the driven rollers, which in turn frictionally drive the wheels of the car, the clutch of the latter being released. With merely the normal frictional resistance of the mechanism of the car such as transmission, differential gearing and wheel bearings, there is no reaction to depress the indicating lever 46 and arm 48. Application of the brakes, however, effects a resistance to the motion of the rotating drums, which resistance automatically manifests itself in a translatory or epicyclic movement of the pinion 40, together with the lever 46 and large spur gear 42. These parts are thus moved bodily downwardly against the resistance of compression spring 50 supplemented by oil dash pot 51, the latter having the function of preventing oscillatory or vibratory action of the mechanism.

The dash pot is secured to an arm 57 extending from the end of the lever 46. A flange 161 (Figure 3) projecting from the bearing of the shaft 44 supports a relatively long indicating arm 162 extending to the inner surface of the frame member. This arm is connected to a flexible wire cable 164 extending over sheaves 166 and 168 and the cable is connected to a tension spring 170 (Figure 8). Sheave 168 is keyed to a small shaft 172 extending the length of the carriage and through side walls thereof. Numbered indicating dials 174 are secured to the ends of shaft 172, which dials parallel the outer faces of the carriage immediately adjacent thereto. The indicating mechanism just described is provided with each brake testing unit, making eight dials in all, two for each wheel facilitating readings from both the front and rear of the apparatus. As previously described, with application of the brakes, the lever 48 and arm 62 are moved downwardly, the extent of motion being indicated by the dial reading in pounds, the spring 170 functioning to rotate the sheave 168 and its shaft with reduction of its tension as the lever is moved downwardly.

The braking resistance of all four brakes may be taken at one time or obviously only one brake may be tested at a time. The resistance of each brake in pounds is measured directly by the scale reading, of release of tension on spring 170 the degree of compression of spring 50 and the dash pot being a direct function of the resistance offered by the brake under definite pedal load. Variations in pedal pressure simulating road usage are thus reflected in the degree of resistance as indicated in dials. Adjustment of lining clearance, position of anchors, etc., may be made to increase the efficiency of each brake and the several brakes may thus be equalized.

While several illustrative embodiments have been described in detail, it is not our intention to limit the scope of the invention to those particular embodiments, or otherwise than by the terms of the appended claims.

We claim:

1. In a testing apparatus of the class described, an angular structure comprising a tongue like stationary support angularly extending from the body of said apparatus, and a bar member adjustably and universally mounted on said support.

2. In a testing apparatus of the class described, an angular structure comprising a tonguelike stationary support angularly extending from the body of said apparatus, and a bar member adjustably and universally mounted on said support, said bar member provided with hooks at its ends adapted to be secured to parts of a vehicle to be tested.

3. A brake testing apparatus for automotive vehicles comprising a stationary frame means on the frame for rotatably supporting the front wheels of the vehicle, inclined members on the frame, one extending in front of each of the wheels, and spaced rotatable guide members on the extensions for determining the path of rotation of the wheels said guide members being mounted on the inclined members to swing into and from operative position.

4. Apparatus for testing the brakes of an automobile comprising a stationary carriage and a movable carriage each supporting rotatable wheel support members, power means for imparting relative motion to said carriage members, and manually operated control means for selectively determining the direction of movement of said carriage, together with lever means on said manual control means for automatically rendering inoperative said power means to stop movement of said movable carriage.

5. A brake testing apparatus comprising means for supporting and rotating the wheel, and means associated therewith including spaced members for determining the path of rotation of the wheel said members being movable into and from operative position.

6. A brake testing apparatus comprising a runway, means intercepting the runway for supporting and rotating a wheel, a yoke pivoted on the runway to swing above and below the runway, and members on the respective ends of the yoke for determining the path of rotation of the wheel.

7. A brake testing apparatus comprising a frame, a wheel supporting and driving member thereon, a gear train for driving the member, an indicating lever pivoted to the axis of the member, a flexible tension member secured to the free end of the lever, a shaft arranged transversely of the frame and connected to the tension member to be rotated thereby, an indicating dial on each end of the shaft, means yieldingly resisting movement of the lever, and means for damping vibrational movements of the lever.

8. A brake testing apparatus comprising a frame, a wheel supporting and driving member thereon, a gear train for driving the member, an indicating lever pivoted to the axis of the member, a flexible tension member secured to the free end of the lever, a shaft supported for rotation transversely of the frame and connected to the tension member to be rotated thereby, an indicating dial on each end of the shaft paralleling the respective sides of the frame, a compression spring yieldingly resisting movement of the lever, and a dash pot for damping vibrational movements of the lever.

9. In an apparatus for testing the brakes of a vehicle, the combination of a frame, a pair of rotors rotatably mounted in said frame adapted to receive the wheels of a vehicle, and means for anchoring a vehicle on said rotors comprising a screw, a member pivotally connected to said screw, and a chain connected to and extending from the vehicle near opposite sides thereof and connected to said member.

ADIEL Y. DODGE.
ROBERT J. STATZ.